US005364464A

United States Patent [19]

Sereboff

[11] Patent Number: 5,364,464
[45] Date of Patent: Nov. 15, 1994

[54] MOISTURE ABSORBING AND FRICTIONAL GRIP ENHANCING COMPOSITION AND METHOD OF FORMING SAME

[76] Inventor: Aaron P. Sereboff, 2215 Millridge Rd., Owings Mills, Md. 21117

[21] Appl. No.: 177,369

[22] Filed: Jan. 5, 1994

[51] Int. Cl.⁵ ............................................. C09K 3/14
[52] U.S. Cl. ....................................................... 106/36
[58] Field of Search .......................... 106/36; 501/122

[56] References Cited

U.S. PATENT DOCUMENTS

| | | | |
|---|---|---|---|
| 1,851,036 | 3/1932 | Brackett | 106/36 |
| 2,012,259 | 8/1935 | Denman | 106/36 |
| 2,626,219 | 1/1953 | Wagner | 106/36 |
| 2,698,250 | 12/1954 | Leichner | 106/36 |
| 2,987,447 | 6/1961 | Ward | 167/92 |
| 3,035,988 | 5/1962 | Cohen | 167/92 |
| 3,271,170 | 9/1966 | Ahlberg et al | 106/36 |
| 4,563,218 | 1/1986 | Schuler | 106/36 |
| 4,572,690 | 2/1986 | Savanuck | 401/200 |
| 4,800,076 | 1/1989 | Bhat et al. | 424/69 |

Primary Examiner—Karl Group
Assistant Examiner—Chris Gallo
Attorney, Agent, or Firm—Morton J. Rosenberg; David I. Klein

[57] ABSTRACT

A moisture absorbing and frictional grid enhancing composition is provided which combines powdered magnesium silicate particulates and sawdust particulates in a weight percentage ratio approximating 50%-90% by weight of sawdust particulates to the overall composition weight. The powdered magnesium silicate particulates are mixed with the sawdust particulates in a dry state to form the overall moisture absorbing and frictional grip enhancing composition which has a spongy feel to the user and optimizes both moisture absorption and frictional gripping of an implement.

14 Claims, No Drawings

MOISTURE ABSORBING AND FRICTIONAL GRIP ENHANCING COMPOSITION AND METHOD OF FORMING SAME

BACKGROUND OF THE INVENTION

1. Field of the Invention

This invention directs itself to a moisture absorbing and frictional grip enhancing composition and method of forming same which increases the frictional grip on an implement while simultaneously providing an interface which is comfortable for the user to grip the implement and absorbs moisture generally in the form of user perspiration to provide the user with additional control of the implement. In particular, this invention relates to a moisture absorbing and frictional grip enhancing composition being formed of two basic components, namely, magnesium silicate particulates in combination with sawdust particulates. More in particular, this invention directs itself to a moisture absorbing and frictional grip enhancing composition which provides a weight ratio of 50%-90% of sawdust particulates to 10%-50% of magnesium silicate particulates when taken with respect to the total composition weight. Still further, this invention directs itself to a moisture absorbing and frictional grip enhancing composition which includes predetermined particulate sizing between 100-200 mesh for both of the major compositions of the overall mixture which are magnesium silicate and sawdust particulates. Additionally, this invention relates to a method for forming a moisture absorbing and frictional grip enhancing composition where magnesium silicate particulates are dry mixed with sawdust particulates in predetermined weight percentage ratios to result in the invention composition.

2. Prior Art

Compositions which have tried to enhance frictional gripping capabilities of users are known in the art. Additionally, compositions which have tried to absorb moisture in the form of perspiration from users is also known in the art. The best prior art known to Applicant includes U.S. Pat. Nos. 2,987,447; 3,035,988; 4,563,218; 2,012,259; 2,698,250; 2,626,219; 4,800,076; 4,572,690; 3,271,170; and, 1,214,157.

In different compositions of the prior art such as that shown in U.S. Pat. No. 2,987,447, there are provided hand conditioner compositions to improve the gripping or anti-slip characteristics of user-implement interface in various environments. In such prior art composition there is provided a combination of rosin and talc used in varying extents. However, although the use of rosin and talc compositions in combination provide for some moisture absorption and frictional enhancement, what is generally left is a tacky type of mixture which adheres to the skin of the user and is difficult to remove. Additionally, such does not provide a spongy type of interface between the user's hand and the implement, which causes a discomfort for the user and results in less control of the implement.

In other prior art compositions, such as that shown in U.S. Pat. No. 3,035,988, there is a rosin type of composition used with ingredients including diatomaceous earth, magnesium oxides and zinc stearates. Such compositions are generally related to talcum powder and once again, does not provide for the advantages of the subject invention concept composition as previously discussed relating to the spongy quality and comfort of the user.

In other prior art compositions such as that shown in U.S. Pat. No. 4,563,218, rosin is provided in quantities up to 50% by weight of a total mixture which is not useful in the subject invention composition since the resulting rosin tackiness and difficulty in removal from the skin of a user is increased.

SUMMARY OF THE INVENTION

A moisture absorbing and frictional grip enhancing composition is provided which includes both first and second predetermined weights of powdered magnesium silicate particulates and sawdust particulates respectively within a predetermined size range, The total mixture composition is established by mixing the powdered magnesium silicate particulates with the sawdust particulates in a dry state to form the overall moisture absorbing and frictional grip enhancing composition of the present invention concept.

DESCRIPTION OF THE PREFERRED EMBODIMENTS

A moisture absorbing and frictional grip enhancing composition and method of forming the same is provided which has advantages over prior compositions relating to comfort, moisture absorbing qualities of the composition, as well as enhanced frictional grip of an implement. The moisture absorbing and frictional grip enhancing composition of the subject invention concept is generally directed for use with any implement which is to be grasped by a user but has particular use in any sport or type of activity where the user wishes to maintain an implement in a tight grip and under conditions where perspiration is a consideration. Such moisture absorbing and frictional grip enhancing compositions may be used for user gripping of implements related to racket sports such as tennis, racquetball, golf as well as weight lifting, baseball or any type of sport where the user wishes to enhance the gripping action of an implement.

The general useful qualities of a moisture absorbing and frictional grip enhancing composition is that such should increase the frictional grip between a user's hand and an implement while simultaneously absorbing the user's perspiration. Additional parameters which are to be optimized directs itself to the feel of the particular composition being used. Where the composition is grainy or particulates are of too large a size, such does not provide for a soft feel with respect to the implement being grasped. Where such a grainy composition is provided, user discomfort may manifest itself in less control of the implement being handled.

Although, not oftentimes referred to, friction or grip enhancing compositions should be easily cleansed from the skin of the user subsequent to use which has been a problem area not addressed in some prior compositions.

There have been many different types of compositions which have used rosin to aid in gripping however, such systems have been found to provide a tacky feeling to the user's hands and although providing a high coefficient of friction, such does not materially aid in absorbing perspiration of the user and is not easily removable from the hands. Additionally, talcum powder has been placed in combination with rosin to provide an absorbing type of system but such composition only absorbs perspiration to a low extent while maintaining the tacky residue on the hands of the user.

Sawdust has been used for some types of liquid absorbing capabilities and is known to have been used in barns and other areas where liquid absorption is necessary however, the sawdust used in these types of environments is generally formed of large shavings, sometimes in the size range of ½"–1" in length. Such sawdust type particles are substantially rigid formations which cannot be used by a user grasping an implement due to the fact that the shavings are cut into the hand and cause discomfort. Additionally, large sized sawdust shavings do not provide the frictional enhancement necessary in gripping an implement.

The inventor has found that by mixing a first predetermined weight of powdered magnesium silicate particulates and a second predetermined weight of sawdust particulates, the moisture absorbing and frictional grip enhancing resulting composition has great advantages over that which is known. The first predetermined weight of powdered magnesium silicate particulates and the second predetermined weight of sawdust particulates are mixed in a dry state to form the overall moisture absorbing and frictional grip enhancing composition of the subject invention concept.

The particulates used in the subject invention system has a combined effect between the different particulate compositions which is not evident. The powdered magnesium silicate particulates adsorb to the sawdust particulates in the mixed and dry state and the resulting composition becomes spongy in texture prior to use. The powdered magnesium silicate particulates and the sawdust particulates are mixed together in the dry state and then allowed to settle in a substantially dry environment for a period of time which allows the spongy quality to emerge. By microscopic examination, it is seen that the magnesium silicate particulates appear to adhere to individual particulates of sawdust to form the overall moisture absorbing and frictional grip enhancing composition as herein described.

When used for grasping an implement, the composition of the subject invention system increases the frictional grip of the user while at the same time providing a soft and highly perspiration absorbing composition. Additionally, subsequent to use, any residue is easily washed from the skin of the user by merely passing an aqueous solution over the user's skin with the subject composition being easily removed.

The inventor did at first begin to use a singular composition of sawdust particulates to provide the moisture absorbing and frictional grip enhancing composition however, the sawdust particulates even in an extremely small size range were found to present hardened point forces to the skin of the user and cause discomfort. Additionally, the frictional gripping of the implements was not found to be greatly enhanced over that of no composition being used although there was some increase in the frictional qualities observed. The mere use of the sawdust particulates did allow for a moisture absorbing composition but did not greatly increase the frictional qualities and further caused discomfort to the users when the implement did slip and there was a displacement of the particulates contiguous the skin of the user.

Magnesium silicate particulates were used in the form of talcum powder. Talcum powder particulates were found to be of use in the size range of approximately 100–200 mesh size dimensions when used in combination with sawdust particulates also in the approximate size range between 100–200 mesh. The use of talcum powder is advantageous only from the viewpoint of it is generally perfumed and provides a pleasing scent to the user however, such is not important to the inventive concept as herein described.

The magnesium silicate particulates generally had a liquid absorption percentage of between 35%–50% of the weight of the magnesium silicate particulates.

Additionally, the size range of the magnesium silicate particulates were found to be advantageous when slightly less than or substantially equal to the size range of the sawdust particulates. Although the exact process is not known, it is believed that the magnesium silicate particulates adsorbed on the surfaces of the sawdust particulates. This effect appeared to be greatest when the sawdust particulate sizes were greater than the particulate sizes of the magnesium silicate particulates. Once again the exact mechanism is not known however, it is believed that where the sawdust particulate surface areas were greater than the magnesium silicate particulate surface areas, such presented a larger area for adherence.

Various percentage ranges were used for the weight of the overall mixture of the sawdust particulates and the magnesium silicate particulates in combination. It was found that where too great an amount of magnesium silicate particulates were used, there appeared to be a clumping effect with the mixture appearing to be non-homogeneous. The result appeared to lower the moisture absorption capabilities when the magnesium particulate weight percentage was increased over 50% of the total mixture weight. Additionally when the sawdust particulate weight percentage was increased over 90% of the total mixture composition, the sponginess texture was reduced with an increase of discomfort to the user. It was difficult to obtain the particular percentage ratios due to the fact that discomfort levels between different users varied and trying to quantify the optimum percentage ranges was extremely difficult and to a certain extent individualistic.

However, it was found that with a weight percentage of within the approximating range of 50%–90% of sawdust particles to 10%–50% of magnesium silicate particulates, that the overall composition maintained a spongy type of texture and did provide a comfort level in useful operation. An optimizing composition system appears to be approximately 90% by weight of sawdust particulates to 10% by weight of magnesium silicate particulates.

When the percentage of the sawdust particulates was dropped below 50% by weight of the total mixture, the particulates appeared to provide a discomfort on the skin of the user and although there was still high liquid absorption. When the sawdust particulate weight percentage was above approximately 90% of the total weight mixture, the magnesium silicate particulates did not appear to provide the sufficient spongy total mixture and once again resulted in a higher discomfort level among users gripping implements.

Further, this invention concept provides and contemplates a method of forming the moisture absorbing and frictional grip enhancing composition. Initially, a first predetermined weight of powdered magnesium silicate particulates is established in a container. A second predetermined weight of sawdust particulates is provided in a second container with both of the first and second predetermined weights of respective powdered magnesium silicate particulates and sawdust particulates being in the dry state.

The particulates are established within the size dimensions of 100-200 mesh and then mixed in a third container and agitated for thorough mixing. The combined mixture is then allowed to settle in a dry state for a period of time which has been in the region of 24 hours. The resulting composition is found not to be gritty or tacky in nature but rather to be spongy and provides a comfortable interface between the hand of a user and the implement which is being gripped.

The first and second predetermined weights of particulates are mixed in the third container within a weight ratio of an approximating range of 50%-90% of sawdust particles to 10%-50% magnesium silicate particulates.

The resulting mixture produced has been found to have a reasonable shelf life and is accepted by users as an improvement over prior gripping compositions.

Although this invention has been described in connection with specific forms and embodiments thereof, it will be appreciated that various modifications other than those discussed above may be resorted to without departing from the spirit or scope of the invention, For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A moisture absorbing and frictional grip enhancing composition comprising:
   (a) powdered magnesium silicate particulates; and,
   (b) sawdust particulates, said powdered magnesium silicate particulates being mixed with said sawdust particulates in a dry state to form said moisture absorbing and frictional grip enhancing composition, 2. The moisture absorbing and frictional grip enhancing composition as recited in claim 1 where said powdered magnesium silicate particulates is a talcum powder composition.

3. The moisture absorbing and frictional grip enhancing composition as recited in claim 2 where said powdered magnesium silicate particulates have a particle size within the range of about 100 to 200 mesh.

4. The moisture absorbing and frictional grip enhancing composition as recited in claim 2 where said talcum powder composition has a liquid absorption capability of about 35% to 50% of its own weight.

5. The moisture absorbing and frictional grip enhancing composition as recited in claim 2 where said sawdust particulates have a particle size of about 100 to 200 mesh.

6. The moisture absorbing and frictional grip enhancing composition as recited in claim 2 where said weight of said sawdust particulates is in the range of about 50% to 90% by weight of the total mixture.

7. The moisture absorbing and frictional grip enhancing composition as recited in claim 2 where the composition is comprised of about 90% sawdust and about 10% magnesium silicate by weight.

8. The moisture absorbing and frictional grip enhancing composition as recited in claim 1 where said sawdust particulates have a particle size greater than that of said magnesium silicate particulates.

9. A method of forming a moisture absorbing and frictional grip enhancing composition including the steps of:
   (a) providing a first weight of magnesium silicate particulates;
   (b) providing a second weight of sawdust particulates; and,
   (c) mixing said magnesium silicate and sawdust particulates in a dry state to form said moisture absorbing and frictional grip enhancing composition.

10. The method of forming a moisture absorbing and frictional grip enhancing composition as recited in claim 9 where the step of providing establishing said first weight includes the step of sizing said magnesium silicate particulates to a particle size in the range of about 100 to 200 mesh.

11. The method of forming a moisture absorbing and frictional grip enhancing composition as recited in claim 9 where the step of providing said second weight includes the step of sizing said sawdust particulates to a particle size in the range of about 100 to 200 mesh.

12. The method of forming a moisture absorbing and frictional grip enhancing composition as recited in claim 9 where the step of providing said first weight of said magnesium silicate particulates includes the step of providing a liquid absorption capability of said magnesium silicate particulates within the range of about 35% to 50% of a weight of said magnesium silicate particulates.

13. The method of forming a moisture absorbing and frictional grip enhancing composition as recited in claim 9 where said second weight of said sawdust particulates is within the range of about 50% to 90% by weight of the total mixture composition.

14. The method of forming a moisture absorbing and frictional grip enhancing composition as recited in claim 9 where said second weight of said sawdust particulates is approximately 90% by weight of the total mixture composition.

* * * * *